United States Patent
Ito et al.

(10) Patent No.: US 7,510,801 B2
(45) Date of Patent: Mar. 31, 2009

(54) ALKALINE BATTERY AND METHOD FOR PRODUCING THE SAME

(75) Inventors: Noriyuki Ito, Minou (JP); Minajuro Ushijima, Nishinomiya (JP); Shinichi Iwamoto, Takarazuka (JP); Tetsuo Izu, Ibaraki (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 994 days.

(21) Appl. No.: 10/617,637

(22) Filed: Jul. 11, 2003

(65) Prior Publication Data

US 2004/0009394 A1    Jan. 15, 2004

(30) Foreign Application Priority Data

Jul. 12, 2002   (JP)   ............................ 2002-204149
Oct. 28, 2002   (JP)   ............................ 2002-312353

(51) Int. Cl.
  *H01M 10/30*   (2006.01)
  *H01M 4/32*    (2006.01)
  *H01M 4/42*    (2006.01)
  *H01M 4/50*    (2006.01)

(52) U.S. Cl. .................. 429/206; 429/223; 429/224; 429/229

(58) Field of Classification Search .................. None
See application file for complete search history.

(56) References Cited

U.S. PATENT DOCUMENTS 6,936,378 B2 *  8/2005  Randell ................. 429/206
2004/0072070 A1  4/2004  Miyamoto et al.
2005/0170246 A1 *  8/2005  Slezak .................. 429/209

FOREIGN PATENT DOCUMENTS

| JP | 56-076172 A | 6/1981 |
| JP | 07-335227 A | 12/1995 |
| JP | 10-40926 A | 2/1998 |
| JP | 2000-306575 | 11/2000 |

(Continued)

OTHER PUBLICATIONS

Patent Abstracts of Japan, Publication No. 2002-015748 dated Jan. 18, 2002 (1 pg).

(Continued)

*Primary Examiner*—John S Maples
(74) *Attorney, Agent, or Firm*—Birch, Stewart, Kolasch & Birch, LLP

(57) ABSTRACT

There is provided an alkaline battery produced by sealing in an outer package body: a positive mixture containing at least one selected from manganese dioxide and a nickel oxide, a conducting agent, and an alkaline electrolytic solution (A) containing potassium hydroxide; a separator; and a negative mixture containing zinc alloy powder, a gelling agent, and an alkaline electrolytic solution (B) containing potassium hydroxide where a concentration of potassium hydroxide of the alkaline electrolytic solution (A) is 45 wt % or more, and a concentration of potassium hydroxide of the alkaline electrolytic solution (B) is 35 wt % or less. Because of this, an alkaline battery can be provided, which has desirable load characteristics, prevents the generation of gas, prevents a decrease in a storage property due to the reaction with an electrolytic solution, and has heat generation behavior suppressed at a time of occurrence of a short-circuit.

3 Claims, 3 Drawing Sheets

FOREIGN PATENT DOCUMENTS

| | | |
|---|---|---|
| JP | 2001-68121 | 3/2001 |
| JP | 2001-283842 A | 10/2001 |
| JP | 2002-15748 | 1/2002 |
| WO | WO-00/79622 A1 | 12/2000 |
| WO | WO-01/86740 A2 | 11/2001 |
| WO | WO-02/41422 A1 | 5/2002 |

OTHER PUBLICATIONS

Patent Abstracts of Japan, Publication No. 2000306575A dated Nov. 2, 2000 (1 pg).

Patent Abstracts of Japan; Publication No. 2001-068121 dated Mar. 16, 2001 (1 pg).

* cited by examiner

ALKALINE BATTERY AND METHOD FOR PRODUCING THE SAME

BACKGROUND OF THE INVENTION

1. Field of the Invention

The present invention relates to an alkaline battery having desirable load characteristics and a method for producing the same.

2. Description of the Related Art

An alkaline battery containing zinc as a negative active material is used as a power source of various kinds of electronic equipment, and is required to have various characteristics depending upon its use. Particularly, in a digital camera that has been widely spread in recent years, in order to maximize the number of photographs, it is necessary to increase the capacity of a battery and further enhance load characteristics such as large current discharging characteristics. Design of a battery that can satisfy the requirements has been studied.

In order to increase the capacity of a battery, it is necessary to increase the amount of an active material. However, if the active material is not used effectively for discharging, an increase in the capacity of a battery cannot be achieved. Therefore, the above object cannot be achieved merely by increasing the amount of the active material. The discharge capacity is dependent on the utilization factor of the active material, so that it is important to ensure satisfactory conductivity of the active material and to uniformly fill the battery with the active material. Also, it is necessary that a positive electrode, a negative electrode, and an electrolytic solution are designed so as to allow a discharging reaction to proceed smoothly.

Furthermore, in order to enhance load characteristics, it is necessary to increase a reaction area of the active material and to enhance conductivity. Along with an increase in the reaction area of the active material, gas is likely to be generated due to the reaction with an electrolytic solution. Therefore, zinc, which is in a negative electrode and is a negative active material, generally is formed into an alloy with an additive element capable of suppressing the generation of gas.

However, due to the increase in the battery's content of the additive element, conductivity is likely to be decreased. Therefore, it is difficult to satisfy both the suppression of the generation of gas and load characteristics. Furthermore, a zinc compound (in particular, zinc oxide) generally is contained in an electrolytic solution so as to suppress self-discharging, which may decrease load characteristics.

Furthermore, even if a battery with desirable load characteristics can be designed, another problem described below occurs, so that there still remain problems to be solved in order to obtain a practical battery. More specifically, the storage property at high temperature may be degraded, a battery may be short-circuited erroneously or by the malfunction of electronic equipment. Accordingly, when an excess current flows through a battery, the temperature of the battery increases due to the heat generated therein, which may cause leakage of an electrolytic solution and a rupture of the battery. In particular, as a capacity of a battery is increased and a battery is designed for a higher load, the reactivity of an electrode is increased, and the amount of heat generation is increased.

SUMMARY OF THE INVENTION

In an embodiment of the present invention, an alkaline battery is designed that has desirable storage properties and is unlikely to have an abnormal behavior such as a rapid increase in temperature due to heat generation caused by, for example, a short-circuit, while having desirable load characteristics with a high capacity.

An embodiment of the present invention includes an alkaline battery produced by sealing in an outer package body: a positive mixture containing at least one selected from manganese dioxide and a nickel oxide, a conducting agent, and an alkaline electrolytic solution (A) containing potassium hydroxide; a separator; and a negative mixture containing zinc alloy powder, a gelling agent, and an alkaline electrolytic solution (B) containing potassium hydroxide, wherein a concentration of potassium hydroxide of the alkaline electrolytic solution (A) is 45 wt % or more, and a concentration of potassium hydroxide of the alkaline electrolytic solution (B) is 35 wt % or less.

Furthermore, an embodiment of the present invention includes a method for producing an alkaline battery, including: disposing a positive mixture containing at least one selected from manganese dioxide and a nickel oxide, a conducting agent, and an alkaline electrolytic solution (A) containing potassium hydroxide in an outer package body;

disposing a separator inside the positive mixture;

introducing an alkaline electrolytic solution (C) containing potassium hydroxide in a concentration of 20 to 40 wt % into the outer package body; and filling a gap inside the separator with a negative mixture containing zinc alloy powder, a gelling agent, and an alkaline electrolytic solution (B) containing potassium hydroxide, wherein a concentration of potassium hydroxide of the alkaline electrolytic solution (A) is 45 wt % or more, and a concentration of potassium hydroxide of the alkaline electrolytic solution (B) is 35 wt % or less.

Furthermore, an embodiment of the present invention includes a method for producing an alkaline battery, using a positive mixture obtained by mixing at least one selected from manganese dioxide and a nickel oxide, a conducting agent, and an alkaline electrolytic solution containing potassium hydroxide in a concentration exceeding 50 wt % at a temperature in a range of 35° C. to 70° C.

Furthermore, an embodiment of the present invention includes an alkaline battery including a positive mixture containing at least one selected from manganese dioxide and a nickel oxide as a positive active material and a negative mixture containing a negative active material, wherein the positive mixture contains an alkaline electrolytic solution containing potassium hydroxide, and an amount of water contained in the positive mixture is 8.4 to 10 wt % with respect to a total weight of the positive mixture including the alkaline electrolytic solution.

Furthermore, an embodiment of the present invention includes a method for producing an alkaline battery, using a positive mixture containing at least one selected from manganese dioxide and a nickel oxide as a positive active material and an alkaline electrolytic solution containing potassium hydroxide, wherein an amount of potassium hydroxide contained in the positive mixture used for assembly of the battery is 2.4 to 4 wt % with respect to a total weight of the positive mixture including the alkaline electrolytic solution, and an amount of water contained in the positive mixture after assembly of the battery is 8.4 to 10 wt % with respect to a total weight of the positive mixture including the alkaline electrolytic solution.

Furthermore, an embodiment of the present invention includes a method for producing an alkaline battery, using a positive mixture containing at least one selected from manganese dioxide and a nickel oxide as a positive active material and an alkaline electrolytic solution containing potassium hydroxide, wherein an amount of water contained in the positive mixture used for assembly of the battery is 3.0 to 4.2 wt % with respect to a total weight of the positive mixture including the alkaline electrolytic solution, and an amount of water contained in the positive mixture after assembly of the battery is 8.4 to 10 wt % with respect to a total weight of the positive mixture including the alkaline electrolytic solution.

These and other advantages of the present invention will become apparent to those skilled in the art upon reading and understanding the following detailed description with reference to the accompanying figures.

DESCRIPTION OF THE PREFERRED EMBODIMENTS

Embodiment 1

Figure 1:
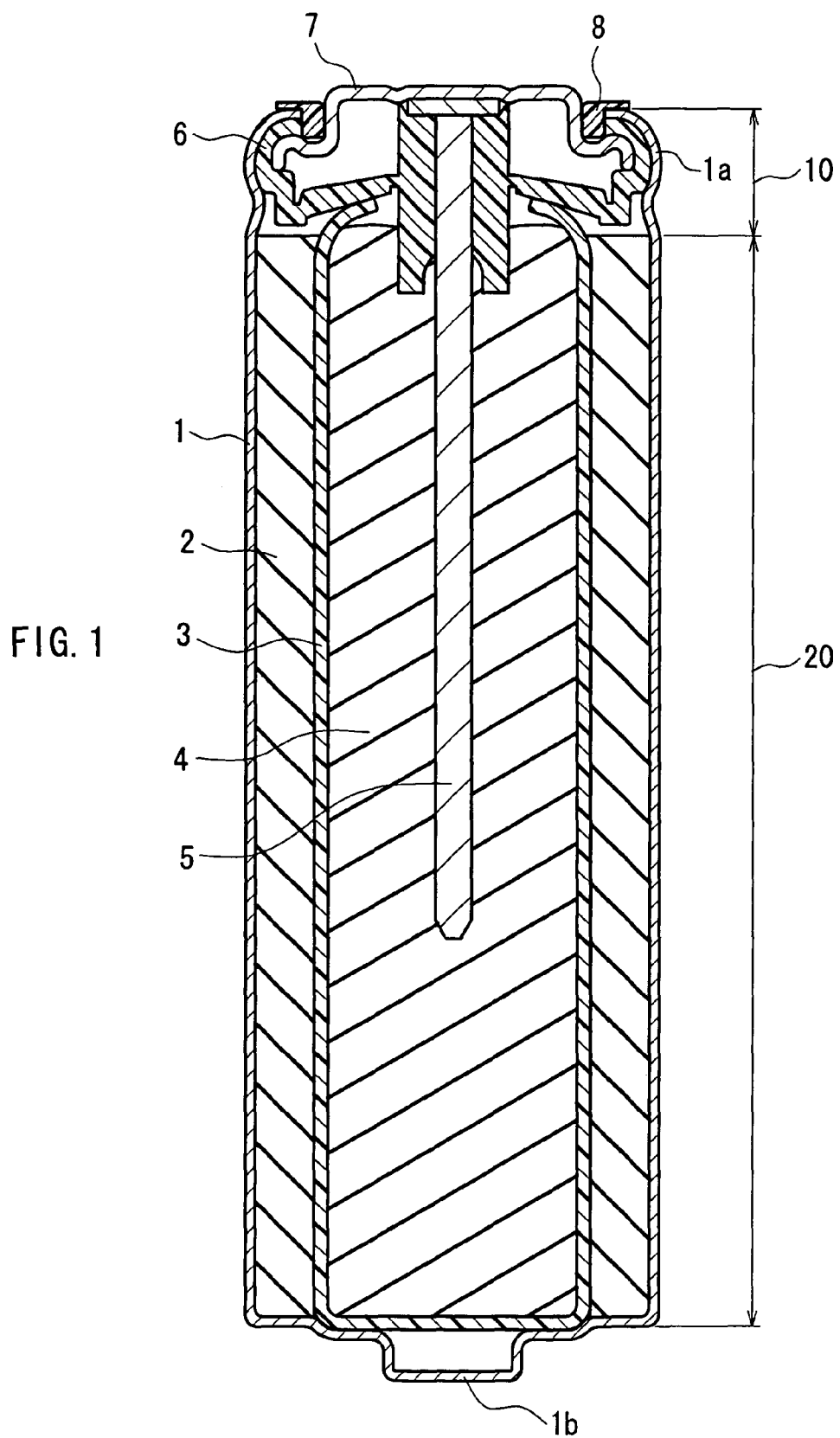
FIG. 1 is a cross-sectional view showing an entire configuration of an alkaline battery using a negative terminal plate as a support member that supports a sealing member from inside, in accordance with an embodiment of the present invention.

An example of an alkaline battery of the present invention has a first feature in that an alkaline electrolytic solution (A) containing potassium hydroxide in a high concentration of 45 wt % or more is used for forming a positive mixture. The positive mixture is formed by mixing at least one of manganese dioxide and a nickel oxide, a conducting agent, and the above alkaline electrolytic solution (A). By setting the concentration of potassium hydroxide of the alkaline electrolytic solution (A) to be 45 wt % or more, a uniform mixed material is formed such that the mixture may provide a high density fill and enhance the conductivity of the entire mixture. Thus, a battery with a high capacity can be designed, and load characteristics can be enhanced.

On the other hand, in the case where a battery is short-circuited due to the enhanced reactivity of a positive electrode, an excess short-circuit current flows immediately after the occurrence of the short-circuit. However, the rapid discharging reaction of zinc alloy powder of a negative electrode occurs, so that an oxide layer suppressing the reaction is formed on the surface of the zinc alloy powder immediately, which decreases the short-circuit within a short period of time. Therefore, the heat generated during discharging is relatively decreased, and an increase in temperature of the battery is suppressed, which can prevent abnormal behavior such as leakage of an electrolytic solution and a rupture of the battery. If an alkaline electrolytic solution is used, which contains potassium hydroxide in a concentration exceeding 50 wt % as the above-mentioned alkaline electrolytic solution (A), the above effect is likely to be obtained. In addition, an electrolytic solution containing potassium hydroxide in a lower concentration can be used as an alkaline electrolytic solution (B) of a negative mixture (described later), so that particularly desirable effects can be obtained.

The saturation concentration of potassium hydroxide at room temperature is about 50 wt %. Therefore, in the case of using an alkaline electrolytic solution in a concentration higher than 50 wt %, it is desirable to manage the temperature of the mixture. More specifically, the alkaline electrolytic solution generally is prepared under warm conditions so that potassium hydroxide is likely to be dissolved. Therefore, it is easy to prepare a potassium hydroxide aqueous solution in a concentration exceeding 50 wt %. However, in the case where the mixture is prepared at about room temperature or lower, potassium hydroxide is deposited exceeding the saturation amount at that temperature, which may impair the formation of a uniform mixture. Therefore, it is desirable to prepare a mixture constituent in a warm environment so that the electrolytic solution does not reach the saturation concentration, thereby producing a positive mixture. The temperature condition desirably is 35° C. or higher so as to enhance the saturation solution amount of potassium hydroxide, and desirably is 70° C. or lower so as to prevent the composition of the electrolytic solution from changing due to the evaporation of water. Furthermore, even in the case where the concentration of potassium hydroxide is 45 to 50 wt %, by preparing a mixture constituent in a warm environment, the dispersibility of the constituent is enhanced and a uniform mixture is likely to be formed.

As the above-mentioned conducting agent, a carbon material such as graphite, acetylene black, carbon black, and fibrous carbon mainly can be used. Among them, graphite is preferably used. As the positive active material, either one of manganese dioxide, nickel oxyhydroxide, and a nickel oxide such as a compound in which another element is substituted for a part of nickel, or a combination thereof is used. It is desirable that graphite is mixed in a ratio of 6 wt % or more with respect to the total weight of manganese dioxide and a nickel oxide that are positive active materials. The reason for this is that the above-mentioned effect of suppressing abnormal generation of heat at a time of occurrence of a short-circuit can be achieved. On the other hand, a decrease in an amount of the active material is not preferable, so that the ratio of graphite desirably is set to be 8.5 wt % or less.

A small amount of a binder such as carboxymethyl cellulose, methyl cellulose, polyacrylate, polytetrafluoroethylene, and polyethylene also can be contained in the positive mixture. When the additional amount of the binder is large, conductivity is decreased, and the like; however, when the additional amount thereof is small, the contact between the conducting agent and the active material is satisfactory.

Furthermore, an embodiment of the present invention of the alkaline battery has a second feature in that an alkaline electrolytic solution (B) containing potassium hydroxide in a concentration of 35 wt % or less is used for forming a negative mixture. The negative mixture is formed by mixing zinc alloy powder, a gelling agent, and an alkaline electrolytic solution (B) in which potassium hydroxide is dissolved to form a gel mixed material. By setting the concentration of potassium hydroxide of the alkaline electrolytic solution (B) to be 35 wt % or less, the state of an oxide coating on the surface of zinc alloy powder can be appropriately made, the conductivity of the alkaline electrolytic solution is increased to enhance load characteristics, and a discharging reaction proceeds as desired in an initial stage of a short-circuit. Therefore, the above-mentioned effect of suppressing abnormal generation of heat can be obtained.

In particular, it is desirable that indium, bismuth, and aluminum are included as alloy elements of zinc alloy powder. This is because these elements make a preferable surface state of the zinc alloy powder, and have an effect of enhancing load characteristics and suppressing abnormal generation of heat. Furthermore, the addition of these elements increases a reaction area of the zinc alloy powder, so that even when the ratio of minute particles is increased, the reaction with an electrolytic solution is suppressed to prevent the generation of gas. It is desirable that the contents of indium, bismuth, and aluminum respectively are 0.03 to 0.07 wt %, 0.007 to 0.025 wt %, and 0.001 to 0.004 wt %. If the ratio of the minute particles that pass through a 200-mesh sieve is 4 wt % or more with respect to the total weight of the zinc alloy powder, the characteristics during pulse discharging at a large current are further enhanced, which is preferable. The ratio of the minute particles more desirably is 15 wt % or more. On the other hand, in order to form a uniform negative mixture having satisfactory flowability, the ratio of the minute particles desirably is 40 wt % or less.

Furthermore, by allowing the alkaline electrolytic solution (B) to contain a zinc compound, a preferable surface state of the zinc alloy powder also can be made. As the zinc compound, zinc oxide, zinc silicate, zinc titanate, zinc molybdate, and the like can be used. Zinc oxide preferably is used. In order to increase the solubility of the zinc compound, it is desirable that the concentration of potassium hydroxide of the alkaline electrolytic solution (B) is set to be 20 wt % or more. A zinc compound may be contained in the alkaline electrolytic solution (A) in a positive mixture or an alkaline electrolytic solution (C) descried later.

An indium compound such as indium oxide and a bismuth compound such as bismuth oxide can be contained in a small amount in a negative mixture. In the case where these compounds are contained in the negative mixture, the generation of gas due to the reaction between the zinc alloy powder and the electrolytic solution can be effectively further prevented. However, these compounds may decrease load characteristics, so that the contents thereof are determined as required.

An example of the alkaline battery of the present invention is produced by sealing the above-mentioned positive mixture and the above-mentioned negative mixture in an outer package body together with a separator. An insufficient amount of liquid may occur with the alkaline electrolytic solution contained in the positive mixture and the negative mixture. In this case, the process of further injecting an electrolytic solution so as to be absorbed by the separator is required. As an alkaline electrolytic solution (C) to be injected at this time, a solution in which potassium hydroxide is dissolved in a concentration of 20 to 40 wt % is preferably used. More specifically, the above-mentioned effect of suppressing abnormal generation of heat at a time of occurrence of a short-circuit also depends upon the concentration of potassium hydroxide of the alkaline electrolytic solution (C). It is desirable that an electrolytic solution in a lowest possible concentration is used. If the concentration is less than 35 wt %, better results are obtained. On the other hand, after the assembly of a battery, the alkaline electrolytic solutions (A), (B), and (C) in the battery diffuse to be mixed with each other to become a uniform electrolytic solution gradually. In this case, it is desirable that the concentration of each potassium hydroxide of the alkaline electrolytic solutions (A), (B), and (C) is adjusted so that the average concentration of potassium hydroxide of the entire alkaline electrolytic solution is in a preferable range. It also is desirable that potassium hydroxide is contained in a concentration of 20 wt % or more in the alkaline electrolytic solution (C).

Furthermore, if a zinc compound is contained in the alkaline electrolytic solutions (A) and (C), as well as in the alkaline electrolytic solution (B), the effect of reducing the degradation of battery's characteristics are enhanced when the battery is stored at high temperature. If the concentration of potassium hydroxide of the alkaline electrolytic solution (C) is set to be 20 wt % or more, the solubility of the zinc compound is increased, which also is convenient in terms of the addition of the zinc compound.

It is desirable to design a battery so that the average concentration of potassium hydroxide in the entire alkaline electrolytic solution becomes 30 to 37 wt %. The reason for this is as follows. The storage property is enhanced during storage at high temperature by setting the concentration of potassium hydroxide to be 30 wt % or more, and preferable characteristics are obtained at a concentration of 33.5 wt % or more. On the other hand, when the average concentration is set to be 37 wt % or less, load characteristics are enhanced, and the effect of suppressing abnormal generation of heat at a time of occurrence of a short-circuit is likely to be obtained.

Figure 2:
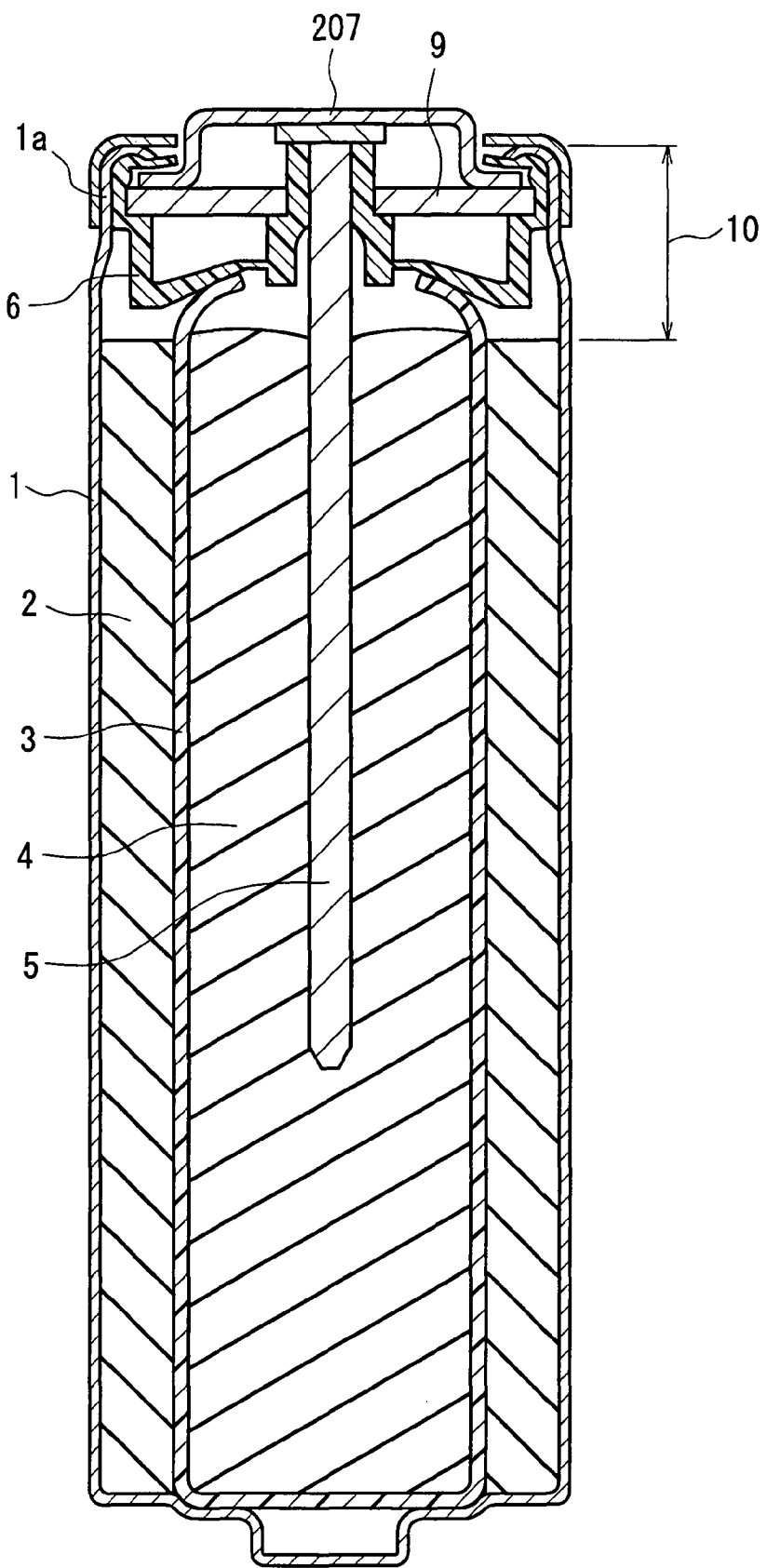
FIG. 2 is a cross-sectional view showing a general configuration of an alkaline battery using a metal washer made of a disk-shaped metal plate as a support member that supports a sealing member from inside.

In the present embodiment, the shape of a battery is not particularly limited. In the case of using a cylindrical metal outer package can as an outer package body, the above-mentioned positive mixture molded in a ring shape is placed in the outer package can, a cup-shaped separator is placed in the positive mixture, then, the alkaline electrolytic solution (C) is injected so as to be absorbed by the separator, a gap inside the separator is filled with the above-mentioned negative mixture, and these components are sealed in the outer package can, whereby a battery is assembled. As shown in FIG. 2, in a cylindrical alkaline battery, an open end (1a) of an outer package can (1) is bent inward to perform sealing, a metal washer (9) made of a disk-shaped metal plate generally is used as a support member for preventing the deformation of a negative terminal plate (207) and supporting a sealing member (6) from inside. However, there is a problem that the volume occupied by a sealing portion (10) is increased.

On the other hand, in a battery shown in FIG. 1 using a negative terminal plate (7) as the support member for supporting the sealing member (6) from inside without using a metal washer, the volume occupied by the sealing portion (10) can be decreased. Accordingly, heat generation at a time of occurrence of a short-circuit is increased along with an increase in capacity of a battery while the amount of the mixtures of a positive electrode (2) and a negative electrode (4) can be increased. However, even in such a battery designed so as to have a high capacity, according to the present invention, abnormal generation of heat in the battery can be prevented, so that the practicability of the battery can be enhanced.

Next, examples of the present embodiment will be described. The present invention is not limited to these examples.

EXAMPLE 1-1

Electrolytic manganese dioxide, graphite, polytetrafluoroethylene powder, and an alkaline electrolytic solution (A) (56 wt % of a potassium hydroxide aqueous solution containing 2.9 wt % of zinc oxide) were mixed in a weight ratio of 87.6:6.7:0.2:5.5, whereby a positive mixture was prepared. The positive mixture was prepared at 50° C. Furthermore, the ratio of graphite with respect to manganese dioxide in the positive mixture was 7.6 wt %.

Furthermore, zinc alloy powder containing indium, bismuth, and aluminum in a ratio of 0.05 wt %, 0.05 wt %, and 0.005 wt %, polyacrylic soda, polyacrylic acid, and an alkaline electrolytic solution (B) (32 wt % of a potassium hydroxide aqueous solution containing 2.2 wt % of zinc oxide) that were binders were mixed in a weight ratio of 39:0.2:0.2:18 to prepare a gel negative mixture. The zinc alloy powder had an average particle size of 122 μm, was passed through a 80-mesh sieve and was not passed through a 200-mesh sieve, and had an apparent density of 2.65 g/cm³.

Next, an alkaline battery having a configuration similar to that shown in FIG. 1 was produced as follows. An outer package can (1) made of a killed steel plate for an AA alkaline battery was used, in which a sealing portion (10) had a thickness of 0.25 mm, a body (20) had a thickness of 0.16 mm, and in order to prevent a positive terminal (1b) from being dented when a battery was dropped, the thickness of the outer package can (1) in the positive terminal (1b) portion was made slightly thicker than that of the body (20).

Then, 11 g of the above positive mixture was molded under pressure to a cylindrical shape with an inner diameter of 9.1 mm, an outer diameter of 13.7 mm, and a height of 41.7 mm to obtain a positive electrode (2), and the positive electrode (2) was inserted in the outer package can (1). Thereafter, a groove was formed at a position of 3.5 mm in the height direction from an open end of the outer package can (1), and in order to enhance the contact between the outer package can (1) and a sealing member (6), the inside of the outer package can (1) was coated with a pitch up to the groove position.

Next, non-woven fabric having a thickness of 100 μm, made of acetalized vinylon fibers with a unit weight of 30 g/m² and refined cellulose fibers (Registered Trade Mark: TENCEL, produced by Tencel Inc.), was wound to a cylindrical shape. A portion to be a bottom was bent and thermally fused to obtain a cup-shaped separator (3) with one end closed. The separator (3) was placed inside the positive electrode (2) inserted in the outer package can (1), and 1.35 g of an alkaline electrolytic solution (C) (32 wt % of a potassium hydroxide aqueous solution containing 2.2 wt % of zinc oxide) was injected into the outer package can (1) so as to penetrate the separator (3). Then, the inside of the separator (3) was filled with 5.74 g of the above negative mixture to obtain a negative electrode (4).

After filling of the above-mentioned electric generating elements, a negative current collector (5) (made of brass with a tinned surface) combined with the sealing member (6) made of Nylon 6-6 was inserted to the central portion of the negative electrode (4). The negative current collector (5) was crimped by spinning from outside of the open end (1a) of the outer package can (1) to produce an AA alkaline battery as shown in FIG. 1. Herein, the negative current collector (5) was previously attached to a negative terminal plate (7) made of a nickel-plated steel plate with a thickness of 0.4 mm formed by stamping. Furthermore, an insulating plate (8) was placed between the open end (1a) of the outer package can (1) and the negative terminal plate (7) so as to prevent a short-circuit.

The alkaline electrolytic solution in the assembled battery contained potassium hydroxide having an average concentration of 35 wt %.

EXAMPLE 1-2

An AA alkaline battery was produced in the same way as in Example 1-1, except that electrolytic manganese dioxide, graphite, polytetrafluoroethylene powder, and an alkaline electrolytic solution (A) were mixed in a weight ratio of 89.3:5.1:0.2:5.6 to prepare a positive mixture. In the positive mixture, the ratio of graphite with respect to manganese dioxide was 5.7 wt %.

EXAMPLE 1-3

An AA alkaline battery was produced in the same way as in Example 1-1, except that 30 wt % of a potassium hydroxide aqueous solution containing 2.0 wt % of zinc oxide was used as the alkaline electrolytic solutions (B) and (C). The alkaline electrolytic solution in the assembled battery contained potassium hydroxide having an average concentration of 33 wt %.

EXAMPLE 1-4

An AA alkaline battery was produced in the same way as in Example 1-1, except that, in the zinc alloy powder of the negative electrode, zinc alloy powder was used, which contained indium, bismuth, and aluminum in a ratio of 0.05 wt %, 0.015 wt %, and 0.003 wt %, had an average particle size of 200 μm, was passed through a 35-mesh sieve, was passed through a 200-mesh sieve in a ratio of 6 wt %, and had an apparent density of 2.9 g/cm³.

EXAMPLE 1-5

An AA alkaline battery was produced in the same way as in Example 1-1, except that, in the zinc alloy powder of the negative electrode, zinc alloy powder was used, which had an average particle size of 135 μm, was passed through a 35-mesh sieve, was passed through a 200-mesh sieve in a ratio of 20 wt %, and had an apparent density of 2.9 g/cm³.

COMPARATIVE EXAMPLE 1-1

An AA alkaline battery was produced in the same way as in Example 1-1, except that 36 wt % of a potassium hydroxide aqueous solution containing 2.4 wt % of zinc oxide was used as the alkaline electrolytic solutions (B) and (C). The alkaline electrolytic solution in the assembled battery contained potassium hydroxide having an average concentration of 39 wt %.

COMPARATIVE EXAMPLE 1-2

An AA alkaline battery was produced in the same way as in Example 1-1, except that 42 wt % of a potassium hydroxide aqueous solution containing 2.9 wt % of zinc oxide was used as the alkaline electrolytic solution (A). The alkaline electrolytic solution in the assembled battery contained potassium hydroxide having an average concentration of 32 wt %.

COMPARATIVE EXAMPLE 1-3

An AA alkaline battery was produced in the same way as in Comparative Example 1-1, except that, in the zinc alloy powder of the negative electrode, zinc alloy powder was used, which had an average particle size of 195 μm, was passed through a 35-mesh sieve, did not pass through a 200-mesh sieve, and had an apparent density of 2.65 g/cm³.

A pulse discharging test was performed with respect to 12 batteries thus produced in each of the above Examples and Comparative Examples. In this test, a pulse current of 2A was allowed to flow for 2 seconds at an interval of 30 seconds with a base discharging current set at 0.5 A. The number of pulse discharging cycles required for a voltage, at a time when the pulse current of 2 A flowed, to decrease to 1.0 V or less was measured and averaged, whereby load characteristics were evaluated.

Figure 3:
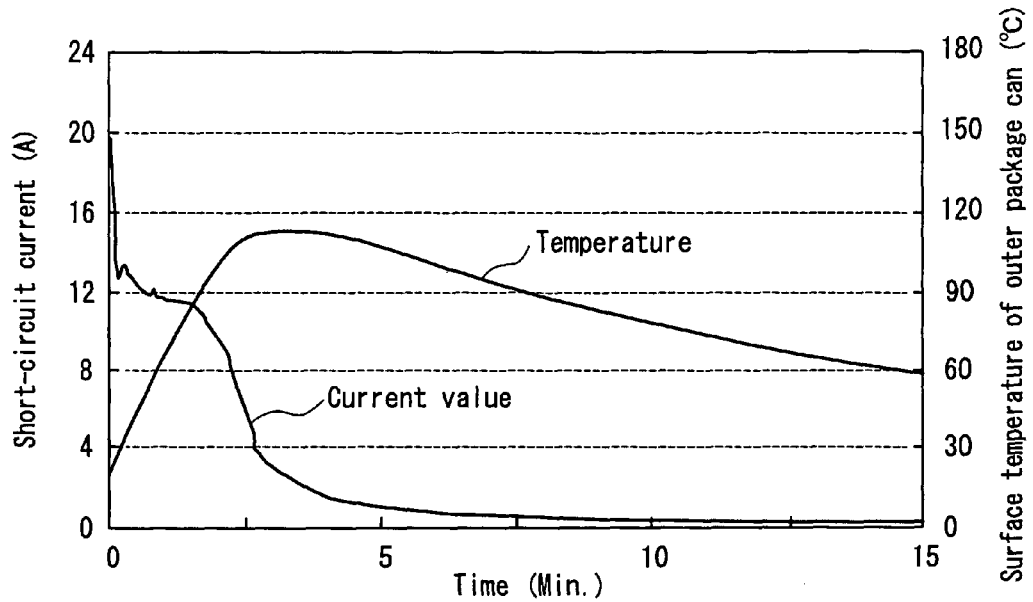
FIG. 3 is a graph showing changes in a short-circuit current and a surface temperature of an outer package can when an alkaline battery of Example 1-3 is short-circuited.

Furthermore, in another 12 batteries, a thermocouple was fixed to a central portion of a side surface of the outer package can (1) of each battery with an aluminum tape. The surface temperature of the outer package can (1) when each battery was short-circuited was measured and averaged, whereby heat generation behavior at a time of occurrence of the short-circuit was evaluated. At this time, in the batteries of Example 1-3 and Comparative Example 1-1, a change in a current value with the passage of time also was measured. Changes in a short-circuit current and in a surface temperature of the outer package can (1) from the commencement of a short-circuit are shown in FIG. 3 (Example 1-3) and in FIG. 4 (Comparative Example 1-1).

Furthermore, another 24 batteries were evaluated. First, 12 batteries among the 24 batteries were discharged at a discharging current of 1A, and a discharging time required for a voltage to decrease to 0.9 V or less was measured and averaged. The average time was determined as a discharging time before storage. Then, the remaining 12 batteries were stored in a thermostatically controlled environment at 60° C. for 20 days. Thereafter, they were taken out of the thermostatically controlled environment and cooled at room temperature for 1 day. Then, the batteries were discharged at a discharging current of 1A, and a discharging time required for a voltage to decrease to 0.9 V or less was measured and averaged. The average time was determined as a discharging time after storage. The ratio of the discharging time after storage with respect to the discharging time before storage was obtained as a capacity retention ratio, and the storage property of the batteries at high temperature was evaluated.

Table 1 shows measurement results for the number of pulse discharging cycles, the surface temperature of the outer package can (1), and the capacity retention ratio. There was no particular problem involved in generation of gas.

TABLE 1

|  | Number of pulse discharging cycles (No.) | Surface temperature of outer package can (° C.) | Capacity retention ratio (%) |
| --- | --- | --- | --- |
| Example 1-1 | 62 | 123 | 88 |
| Example 1-2 | 60 | 146 | 84 |
| Example 1-3 | 68 | 113 | 81 |
| Example 1-4 | 68 | 112 | 89 |
| Example 1-5 | 73 | 138 | 91 |
| Comparative Example 1-1 | 60 | 162 | 90 |
| Comparative Example 1-2 | 67 | 109 | 73 |
| Comparative Example 1-3 | 52 | 112 | 90 |

As is apparent from the results in Table 1, the batteries of the Examples according to the present invention had desirable load characteristics, had generation of heat suppressed at a time of occurrence of a short-circuit, and had desirable storage properties at high temperature. Particularly, in the battery of Example 1-1 in which the ratio of graphite with respect to manganese dioxide in the positive mixture was set in a range of 6 to 8.5 wt %, and the average concentration of potassium hydroxide in the alkaline electrolytic solution in the battery was set to be 33.5 wt % or more, the surface temperature of the outer package can was decreased more than that of the battery of Example 1-2 in which the ratio of graphite was smaller, and the capacity retention ratio was enhanced more than that of the battery of Example 1-3 in which the concentration of potassium hydroxide was smaller.

Furthermore, in the battery of Example 1-4 containing 6 wt % of powder of 200 mesh or less in the zinc alloy powder, in which the ratio of the minute particles was larger than that of Example 1-1, the content ratios of indium, bismuth, and aluminum were optimized, whereby the number of pulse discharging was increased without increasing the surface temperature of the outer package can (1) and decreasing the capacity retention ratio. Furthermore, in the battery of Example 1-5 in which the ratio of the minute particles was increased, although the surface temperature of the outer package can was increased, the number of pulse discharging was increased further.

On the other hand, in the battery of Comparative Example 1-1 in which the concentration of potassium hydroxide of the alkaline electrolytic solution (B) of the negative mixture was set to be higher than 35 wt %, the powder of 35 to 80 mesh was removed, whereby the ratio of the minute particles in the zinc alloy powder was increased more than that of the battery of Comparative Example 1-3. Therefore, the number of pulse discharging was increased more than that of Comparative Example 1-3 in the same way as in Example 1-1; however, the surface temperature of the outer package can (1) was increased substantially compared with that of the battery of Example 1-1. Furthermore, in the battery of Comparative Example 1-2 in which the concentration of potassium hydroxide of the alkaline electrolytic solution (A) of the positive mixture was set to be less than 45 wt %, the capacity retention ratio was decreased substantially. Thus, in either case, practical characteristics were not obtained.

As described above, the present embodiment can provide an alkaline battery that has desirable load characteristics, prevents the generation of gas and a decrease in a storage property due to the reaction with an electrolytic solution, and has heat generation behavior suppressed at a time of occurrence of abnormality and, a method for producing the same.

Embodiment 2

A discharging reaction of a positive electrode of an alkaline battery using manganese dioxide as a positive active material proceeds in accordance with the following Formula (1):

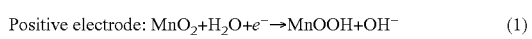

Positive electrode: $MnO_2 + H_2O + e^- \rightarrow MnOOH + OH^-$     (1)

As is apparent from the above Formula (1), water is consumed during discharging at the positive electrode. Therefore, it is desirable that water is present as much as possible on the positive electrode side in the battery in terms of a discharging reaction. This also applies to the case where a nickel oxide such as nickel oxyhydroxide is used as a positive active material.

Regarding the water amount in the positive mixture, it has been conventionally proposed that the ratio of water contained in the positive mixture is set to be 3.5 to 5.0%, and the weight of a potassium hydroxide electrolytic solution contained in the positive mixture after forming a battery is set to be 10.6 to 15.9 wt % with respect to the total solid weight in the positive mixture. Furthermore, it also has been proposed that the additional amount of water in the entire battery is set to be 0.947 to 1.146 g based on 1 AH of theoretical discharge capacity of manganese dioxide in terms of safety and discharging characteristics. This corresponds to the addition of 0.292 to 0.353 g of water based on 1 g of active material, which is very high compared with the water amount (0.207 g) required for a discharging reaction of 1 g of manganese dioxide.

However, in the range of the amount of the electrolytic solution in the positive mixture, the above water amount is not sufficient, so that satisfactory characteristics cannot be obtained at heavy load. On the other hand, when the required water is contained previously in a positive mixture during assembly of a battery, the filling density of an active material is decreased, which makes it impossible to avoid a decrease in capacity. Furthermore, water comes out of the mixture during molding, and the molding strength is lowered to make it difficult to mold the mixture. This causes problems in terms of production. Therefore, it is desirable that the water amount contained in the mixture is minimized during forming of the positive mixture.

More specifically, it is required that the water amount in the positive mixture to be used for assembling a battery is minimized, while the water amount in the positive mixture is maximized after assembling a battery.

The inventors of the present invention did not satisfy the above requirement merely by adjusting the ratio of water contained in the positive mixture and the additional amount of water in the entire battery. The inventors found it desirable to require that an amount of water be moved from the separator or the negative electrode side to the positive mixture after assembling a battery. Furthermore, they found that by appropriately distributing water in a battery, the additional amount of water in the entire battery can be decreased, and a storage property is not degraded at high temperature because of the absence of excess water.

The present embodiment provides an alkaline battery having desirable load characteristics, safety at a time of occurrence of a short-circuit, and a storage property at high temperature by allowing a positive mixture after assembly of a battery to contain a sufficient amount of water required for a reaction, and a method for producing such an alkaline battery.

By assembling an alkaline battery using the above production method, a sufficient amount of water required for a discharging reaction can be contained in a positive mixture after assembly of a battery, and water is appropriately distributed in the battery. Therefore, an alkaline battery can be obtained, which has desirable load characteristics and safety at a time of occurrence of a short-circuit and in which a storage property is less degraded at high temperature, even when the water content in the entire battery is small.

An example of the alkaline battery of the present invention is characterized in that the amount of water contained in a positive mixture is 8.4 to 10 wt % with respect to the total weight of the positive mixture including an alkaline electrolytic solution after assembly of a battery. Therefore, it is required that a relatively large amount of water moves from a separator or a negative electrode side to a positive electrode. In order to allow water to move in this manner, a driving force is required. As a method for generating a driving force, for example, a large difference was previously provided in an alkaline concentration between the electrolytic solution contained in a positive mixture and the electrolytic solution injected during assembly or the electrolytic solution contained in the negative mixture, and after assembly, water in the separator or on the negative electrode side is moved to the positive mixture due to the difference in concentration.

The positive electrode of the present embodiment is obtained by mixing one selected from manganese dioxide and a nickel oxide, a conducting agent, and an alkaline electrolytic solution containing potassium hydroxide, and molding the mixture thus obtained, in the same way as in Embodiment 1. By setting the concentration of potassium hydroxide of an alkaline electrolytic solution to be added for forming a mixture to be higher than 50 wt %, the driving force becomes large, and a large amount of water can be taken in the positive mixture. Furthermore, this enhances the binding force of the mixture to form a uniform mixed material, so that it also is possible to fill an active material at high density. At this time, the density of the positive mixture may be set to be 3.2 to 3.35 g/cm$^3$. Because of this, while a required amount of an active material is kept, a large amount of water can be contained.

Manganese dioxide and a nickel oxide that are positive active materials generally contain a certain amount of water due to adsorption. Therefore, the concentration of potassium hydroxide of the alkaline electrolytic solution contained in the mixture is lower than that of the alkaline electrolytic solution to be added first. Therefore, regarding the water amount, water derived from the positive active material should be considered, and it is desirable that the concentration of an alkaline electrolytic solution to be added to a mixture is set so that the concentration of potassium hydroxide of the alkaline electrolytic solution contained in the final mixture is 40 wt % or more.

Furthermore, regarding the additional amount of the alkaline electrolytic solution, the weight of potassium hydroxide is desirably in a range of 2.4 to 4 wt % with respect to the weight of the entire mixture including the alkaline electrolytic solution contained in the mixture, and the water amount is desirably in a range of 3.0 to 4.2 wt %. Because of this, an appropriate driving force is obtained, and the water amount after assembly of a battery can be easily adjusted to an appropriate range.

In the case of setting the concentration of potassium hydroxide of the alkaline electrolytic solution higher than 50 wt % in the production of the above-mentioned positive mixture, it is desirable that a positive mixture is produced in a warm environment of 35° C. to 70° C. in the same way as in Embodiment 1.

Alternatively, depending upon the purpose, a conducting agent, a binder, and the like can be contained in the positive mixture. As the conducting agent, a carbon material such as graphite, acetylene black, carbon black, and fibrous carbon mainly can be used. Among them, graphite is used preferably in the same way as in Embodiment 1. The additional amount of the conducting agent is desirably 3 wt % or more with respect to the total weight of the positive active material. Because of this, sufficient water is contained in the positive mixture, and the conductivity of a positive electrode is enhanced, whereby the reactivity of the active material is enhanced, and further enhancement of load characteristics can be expected. On the other hand, a decrease in an amount of an active material is not preferable. Therefore, the ratio of the conducting agent is desirably set to be 8.5 wt % or less.

Furthermore, as the binder, carboxymethyl cellulose, methyl cellulose, polyacrylate, polytetrafluoroethylene, polyethylene, and the like can be used in the same way as in Embodiment 1.

In the present embodiment, the reactivity of the positive electrode is enhanced, whereby another effect described below can be expected to be obtained in the same way as in Embodiment 1. More specifically, in the case where abnormality occurs (e.g., a battery is short-circuited by mistake), a large short-circuit current continues to flow. Therefore, the temperature of a battery is rapidly increased due to the generation of heat caused by the flow of a large short-circuit current, whereby leakage and rupture of a battery are likely to be caused. On the other hand, in the battery of the present embodiment, a discharging reaction proceeds more rapidly at a positive electrode than a conventional battery, so that a discharging reaction at a negative electrode also proceeds rapidly. After occurrence of a short-circuit, a large amount of a discharging product is deposited on the surface of a negative electrode to suppress a discharging reaction. As a result, a short-circuit current is decreased within a short period of time, and an increase in temperature of the battery is suppressed, which can prevent the above-mentioned problems.

The driving force for moving water to the positive electrode is not determined solely by the configuration of the positive electrode, and is closely related to other components such as a negative electrode, in particular, to the concentration of potassium hydroxide of an electrolytic solution separately injected into an outer package body and an electrolytic solution contained in a negative mixture. Therefore, it is desirable that the configurations thereof are also optimized. More specifically, if either one of the electrolytic solution to be injected and the electrolytic solution contained in the negative mixture, or desirably both of them have a low alkaline concentration, the above driving force becomes large, and more desirable results are obtained.

Hereinafter, the configuration of a negative electrode will be described. The negative electrode generally is formed as a gel mixture obtained by mixing zinc or zinc alloy powder that is an active material, a gelling agent, and an alkaline electrolytic solution in which potassium hydroxide is dissolved. At this time, it is desirable that the concentration of potassium hydroxide of the electrolytic solution of the negative electrode is 38 wt % or less. As the alkaline concentration of the electrolytic solution is lower, the water content becomes high, whereby the water amount required in the entire battery can be adjusted easily. Furthermore, in order to increase the ion conductivity of the electrolytic solution to enhance the reactivity of the negative electrode, so as to enhance load characteristics and make it easy to obtain a heat generation suppressing effect at a time of occurrence of a short-circuit, the concentration of potassium hydroxide is set to be desirably 35 wt % or less, and more desirably 33.5 wt % or less. On the other hand, as the concentration of potassium hydroxide is increased, characteristics are less degraded when a battery is stored at high temperature. Therefore, the concentration of potassium hydroxide is set to be desirably 28 wt % or more, and more desirably 30 wt % or more.

Furthermore, in order to handle heavy loads such as pulse discharging at a large current, it is desirable that the particle diameter of an active material is decreased to increase a reaction area. For example, the ratio of active material powder passing through a 200-mesh sieve should be set to be 4 wt % or more, and when the ratio is set to be 15 wt % or more, load characteristics are remarkably enhanced. On the other hand, in order to form a uniform negative mixture with satisfactory flowability, the ratio of the minute particles desirably is set to be 40 wt % or less. Thus, in the case where minute particles are contained in a predetermined ratio, problems such as the generation of gas due to the reaction between the active material and the electrolytic solution, a decrease in a discharge capacity, and the like are likely to occur during storage at high temperature. In order to prevent this, elements such as indium, bismuth, and aluminum may be added to zinc. The contents of indium, bismuth, and aluminum are desirably 0.03 to 0.07 wt %, 0.007 to 0.025 wt %, and 0.001 to 0.004 wt %, respectively. Furthermore, as the particle diameter is smaller, the generation of heat at a time of occurrence of a short-circuit becomes a serious problem. In the present embodiment, even in the case where the described minute particles are used, the effect of suppressing the generation of heat can be exhibited sufficiently.

An indium compound such as indium oxide and a bismuth compound such as bismuth oxide can be contained in the negative mixture in a small amount in the same way as in Embodiment 1.

An alkaline battery of the present embodiment is produced by sealing the above-mentioned positive mixture and negative mixture in an outer package body together with a separator. The liquid amount is insufficient only with the alkaline electrolytic solution contained in the positive mixture and the negative mixture. Therefore, the process of further injecting an electrolytic solution so as to be absorbed by the separator and the positive electrode is required in the same way as in Embodiment 1. In the alkaline electrolytic solution to be injected at this time, a solution in which potassium hydroxide is dissolved in a concentration of 35 wt % or less is desirably used so as to increase the content of water to increase the supply of water to the positive electrode. Furthermore, it is desirable that the concentration of potassium hydroxide is 33.5 wt % or less in terms of enhancement of load characteristics and suppression of heat generation at a time of occurrence of a short-circuit. On the other hand, as the concentration of potassium hydroxide is increased, characteristics degrade less when a battery is stored at high temperatures. Therefore, the concentration of potassium hydroxide is desirably 28 wt % or more, and more desirably 30 wt % or more.

Furthermore, in order to enhance the effect of preventing degradation of characteristics during storage at high temperatures, it is desirable that a zinc compound is contained in at least one of the electrolytic solution used for forming a positive mixture, the electrolytic solution used for forming a negative mixture, and the electrolytic solution to be injected separately in the same way as in Embodiment 1. As the zinc compound, a soluble compound such as zinc oxide, zinc silicate, zinc titanate, and zinc molybdate can be used. In particular, zinc oxide is preferably used.

After assembly of a battery, water moves from the injected electrolytic solution or the electrolytic solution in the negative mixture to the positive electrode side. Then, the water is absorbed by the positive mixture, and the water amount in the mixture is increased. The change in the water amount depends upon the conditions such as a storage temperature of a battery. Therefore, the change in the water amount may be completed about 1 to 3 months after assembly of a battery. Thereafter, the water amount in the mixture is assumed to be maintained at a constant value. In this state, the composition and additional amount of each electrolytic solution used for the above-mentioned positive electrode, negative electrode and injection should be adjusted so that the water amount contained in the positive mixture is 8.4 to 10 wt % with respect to the weight of the entire positive mixture including the electrolytic solution. In the case where the water amount is less than 8.4 wt %, problems occur in any of the load characteristics, heat generation at a time of occurrence of a short-circuit, and storage characteristics at high temperature. Furthermore, in the case where the water amount is larger than 10 wt %, the amount of the electrolytic solution contained in the positive mixture is in excess. Consequently, the conductivity is decreased due to the swelling of the mixture, and shortage of the amount of the electrolytic solution on the separator side is caused. Thus, there are problems in the battery's characteristics.

Furthermore, the water amount of the electrolytic solution contained in the positive mixture after assembly of a battery and the concentration of potassium hydroxide are obtained by disassembling the battery to analyze the positive mixture. For example, the water amount can be obtained from the weight change when the positive mixture is dried in an atmosphere excluding the influence of carbonic acid gas, such as in vacuum or an atmosphere of inactive gas. Furthermore, the concentration of potassium hydroxide can be obtained as (amount of potassium hydroxide)/(amount of potassium hydroxide+water amount) by obtaining the amount of potassium hydroxide from a measurement value of the amount of potassium in the mixture, assuming that the measurement value is all derived from potassium hydroxide. The concentration of potassium hydroxide desirably is 35 to 39.5 wt %. The composition of the electrolytic solution in the positive mixture is not necessarily matched with the composition of the electrolytic solution in the negative mixture. Even in a state where the alkaline concentration in the positive mixture is higher, water movement to the positive electrode is completed, and this state may be maintained.

In the present embodiment, as described above, a sufficient amount of water is contained in the positive mixture, whereby water is distributed appropriately in the battery. Therefore, the total water amount in the battery can be made smaller (0.23 to 0.275 g based on 1 g of positive active material) than that of the conventional example. Therefore, excess water is not present in the battery, and characteristics are less degraded when a battery is stored at high temperature. On the other hand, water required for a reaction is ensured, so that a battery exhibiting excellent operation characteristics can be obtained.

Furthermore, in the present embodiment, there is no particular limit to the shape of a battery in the same way as in Embodiment 1.

Hereinafter, examples of the present embodiment will be described. The present invention is not limited to these examples.

EXAMPLE 2-1

An alkaline battery was produced in the same way as in Example 1-1, except that electrolytic manganese dioxide containing 1.6 wt % of water, graphite, polytetrafluoroethylene powder, and an alkaline electrolytic solution (56 wt % of potassium hydroxide aqueous solution containing 2.9 wt % of zinc oxide) for forming a positive mixture were mixed in a weight ratio of 87.6:6.7:0.2:5.5 at 50° C., and a positive mixture with a density of 3.21 g/cm$^3$ was used. In this mixture, the weight ratio of graphite with respect to the total weight of manganese dioxide was 7.6 wt %.

The concentration of potassium hydroxide contained in the positive mixture was 44.6 wt % considering the water contained in manganese dioxide, and the amount of potassium hydroxide and the water amount were 3.1 wt % and 3.7 wt %, respectively, with respect to the total weight of the positive mixture containing an electrolytic solution. Furthermore, the total water amount in the battery at this time was 0.261 g based on 1 g of a positive active material.

Regarding the batteries of Example 2-1 produced as described above, 5 batteries were disassembled, respectively, 1 month, 3 months, and 6 months after assembly of the batteries, and the amounts of potassium and water contained in the positive mixtures were obtained by the following method.

More specifically, each disassembled battery was separated into a positive electrode and an outer package can, and a negative electrode and a separator, and the weight of the positive electrode and the outer package can was measured. The positive electrode and the outer package can were dried at 110° C. for 12 hours in vacuum, and the water amount contained in the positive mixture was obtained from the difference between the weight before drying and the weight after drying. Then, the dried positive mixture was taken out, manganese dioxide was dissolved in an acid, and the weight of potassium was obtained by atomic absorption spectrometry with respect to a solution with a residue removed therefrom. Assuming that the atomic weight of potassium is 39.1, and the formula weight of potassium hydroxide (KOH) is 56.1, the amount of potassium hydroxide was obtained from the amount of potassium by conversion of potassium hydroxide amount=potassium amount×(56.1/39.1). Furthermore, the concentration of potassium hydroxide was obtained with respect to the alkaline electrolytic solution contained in the positive mixture after assembly of a battery, from the formula of concentration of potassium hydroxide=amount of potassium hydroxide/(potassium hydroxide amount+water amount).

Table 2-1 shows an average value of each battery with respect to the water amount and the concentration of potassium hydroxide. The following is understood from Table 2-1: one month after assembly of a battery, required water was taken in a positive mixture; and three months after assembly, the water amount was not changed and this state was maintained.

TABLE 2-1

| Period from assembly of battery | Water amount (wt %) | Concentration of potassium hydroxide (wt %) |
|---|---|---|
| 1 month | 8.6 | 37.8 |
| 3 months | 8.9 | 38.0 |
| 6 months | 8.9 | 38.0 |

EXAMPLE 2-2

An AA alkaline battery was produced in the same way as in Example 2-1, except that 30 wt % of potassium hydroxide aqueous solution containing 2.0 wt % of zinc oxide was used as an alkaline electrolytic solution for forming a negative mixture and an alkaline electrolytic solution for injection. At this time, the total amount water in the battery was 0.268 g based on 1 g of positive active material.

EXAMPLE 2-3

An AA alkaline battery was produced in the same way as in Example 2-1, except that, as the zinc alloy powder of the negative electrode, zinc alloy powder was used, which contained indium, bismuth, and aluminum in a ratio of 0.05 wt %, 0.015 wt %, and 0.003 wt %, had an average particle size of 200 μm, was passed through a 35-mesh sieve, was passed through a 200-mesh sieve in a ratio of 6 wt %, and had an apparent density of 2.9 g/cm$^3$.

EXAMPLE 2-4

An AA alkaline battery was produced in the same way as in Example 2-1, except that, as the zinc alloy powder of the negative electrode, zinc alloy powder was used, which had an average particle size of 135 μm, was passed through a 35-mesh sieve, was passed through a 200-mesh sieve in a ratio of 20 wt %, and an apparent density of 2.9 g/cm$^3$.

COMPARATIVE EXAMPLE 2-1

An AA alkaline battery was produced in the same way as in Example 2-1, except that, as the alkaline electrolytic solution for forming a negative mixture and the alkaline electrolytic solution for injection, 36 wt % of a potassium hydroxide aqueous solution containing 2.4 wt % of zinc oxide was used. At this time, the total water amount in the battery was 0.247 g based on 1 g of positive active material.

COMPARATIVE EXAMPLE 2-2

An AA alkaline battery was produced in the same way as in Example 2-1, except that, as the alkaline electrolytic solution for forming a positive mixture, 42 wt % of potassium hydroxide aqueous solution containing 2.9 wt % of zinc oxide was used. In this battery, the concentration of potassium hydroxide of the electrolytic solution contained in the positive mixture before assembly of the battery was 33.5 wt % considering the water contained in manganese dioxide, and the amounts of potassium hydroxide and water were 2.3 wt % and 4.4 wt %, respectively, with respect to the total weight of the mixture including the electrolytic solution. Furthermore, the total water amount in the battery was 0.270 g based on 1 g of the positive active material.

Regarding 5 batteries of each of Example 2-2, Comparative Example 2-1, and Comparative Example 2-2, the water amount contained in the positive mixture after 3 months after assembly and the concentration of potassium hydroxide of the alkaline electrolytic solution contained in the positive mixture were obtained in the same way as in Example 2-1. Table 2-2 shows these results, and the results of the battery of Example 2-1 together with the total water amount (converted to the amount based on 1 g of a positive active material) in the battery.

The batteries of Examples 2-3 and 2-4 were measured for only the water amount contained in the positive mixture. However, similar results to those of Example 2-1 were obtained. Accordingly, the results are not shown in Table 2-2.

TABLE 2-2

| | Water amount (wt %) | Concentration of potassium hydroxide (wt %) | Water amount in battery (g/1 g of positive active material) |
|---|---|---|---|
| Example 2-1 | 8.9 | 38.0 | 0.261 |
| Example 2-2 | 9.1 | 36.9 | 0.268 |
| Comparative Example 2-1 | 8.2 | 40.8 | 0.247 |
| Comparative Example 2-2 | 8.3 | 33.3 | 0.270 |

As is shown in Table 2-2, in the batteries of Examples 2-1 and 2-2, the water amount contained in the positive mixture was in a range of 8.4 to 10 wt %. Thus, an amount of water sufficient for a reaction of the positive active material was allowed to be contained in the positive mixture. Furthermore, the concentration of potassium hydroxide of the electrolytic solution contained in the positive mixture also was allowed to be set in a desirable range of 35 to 39.5 wt %.

Next, each battery of Examples 2-1 to 2-4, and Comparative Examples 2-1 to 2-2 was measured for load characteristics, battery temperature at a time of occurrence of a short circuit, and storage characteristics at high temperature.

The load characteristics were evaluated as follows. A pulse discharging test was performed. In this test, a base discharging current was set to be 0.5 A, and a pulse current of 2 A was allowed to flow for 2 seconds at an interval of 30 seconds. Then, the number of pulse discharging cycles required for a voltage, at a time when a pulse current of 2 A flowed, to decrease to 1.0 V or less was obtained.

The battery temperature at a time of occurrence of a short-circuit was evaluated as follows. A thermocouple was fixed to the central portion of the side surface of the outer package can of the battery with an aluminum tape. The surface temperature of the outer package can after the battery was short-circuited was measured, and evaluated based on the highest temperature after a short-circuit. The batteries of Example 2-2 and Comparative Example 2-1 were measured for a change in a short-circuit current with passage of time, as well as the surface temperature of the outer package can.

Regarding the storage characteristics at high temperature, a change in a discharge capacity before/after storage at high temperature was checked, and the degree of degradation of battery's characteristics at a capacity retention ratio was evaluated. More specifically, the battery was discharged at a discharging current of 1A, and the discharge capacity before the battery voltage reached 0.9 V was measured. This measured discharge capacity was determined as a discharge capacity before storage. Furthermore, a battery different from the above battery was stored in a thermostatically controlled environment at 60° C. for 20 days. Thereafter, the battery was cooled at room temperature for one day. Then, the battery was discharged at a discharge current of 1A, and the discharge capacity was measured before the battery voltage reached 0.9 V. This measured discharge capacity was determined as discharge capacity after storage. Then, the ratio of a discharge capacity after storage with respect to the discharge capacity before storage was obtained, and this ratio was determined as a capacity retention ratio, whereby storage characteristics at high temperature were evaluated.

Table 2-3 shows the measurement results of the number of pulse discharging cycles, the highest temperature of the surface of the outer package can, and the capacity retention ratio. Furthermore, changes in the surface temperature of the outer package can and a short-circuit current of the batteries of Example 2-2 and Comparative Example 2-1 were the same as those in FIG. 3 and FIG. 4, respectively.

TABLE 2-3

| | Number of pulse discharging cycles (No.) | Highest surface temperature of outer package can (° C.) | Capacity retention ratio (%) |
|---|---|---|---|
| Example 2-1 | 62 | 123 | 88 |
| Example 2-2 | 68 | 113 | 81 |
| Example 2-3 | 68 | 112 | 89 |
| Example 2-4 | 73 | 138 | 91 |
| Comparative example 2-1 | 60 | 162 | 90 |
| Comparative Example 2-2 | 67 | 109 | 73 |

In the batteries of Examples 2-1 to 2-4 according to the present invention, by setting the amount of water contained in the positive mixture to be 8.4 to 10 wt %, even though the total water amount in the battery decreased to 0.23 to 0.275 g based on 1 g of positive active material, excellent load characteristics were obtained, the generation of heat at a time of occurrence of a short-circuit of a battery was suppressed, and characteristics during storage at high temperature were improved. Particularly, in the battery of Example 2-3 containing 6 wt % of powder of 200 mesh or less in zinc alloy powder, in which the ratio of minute particles was larger than that of Example 2-1, the content ratio of indium, bismuth, and aluminum were optimized, whereby load characteristics were enhanced compared with those of the battery of Example 2-1, without increasing a temperature due to excess heat generation and decreasing a capacity retention ratio. Furthermore, in the battery of Example 2-4 in which the ratio of minute particles was increased compared with Example 2-3, although the temperature of the battery was increased slightly, load characteristics were increased further while excellent storage characteristics at high temperature were maintained.

Figure 4:
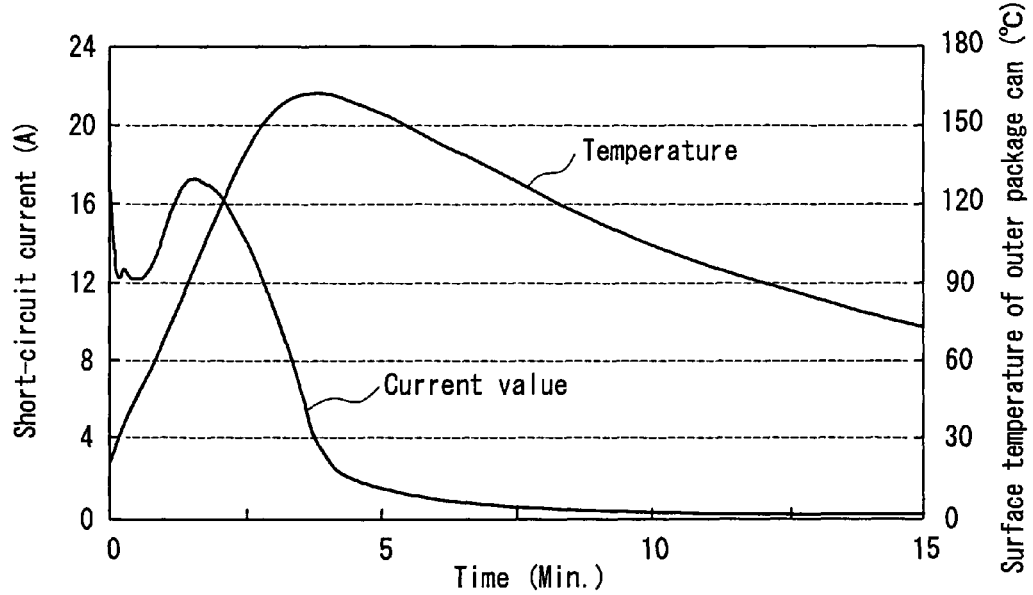
FIG. 4 is a graph showing changes in a short-circuit current and a surface temperature of an outer package can when an alkaline battery of Comparative Examples 1-1 is short-circuited.

On the other hand, in the batteries of Comparative Examples 2-1 and 2-2 in which the amount of water contained in the positive mixture did not reach the above range, heat generation at a time of occurrence of a short-circuit was large, and the battery temperature increase was large, or the storage characteristics at high temperature were degraded. Thus, practical characteristics were not obtained in either case. Regarding the increase in temperature at a time of occurrence of a short-circuit, as shown in FIGS. 3 and 4, in the battery of Example 2-2 of the present invention, a short-circuit current was decreased within a short period of time, so that heat generation was small, and the increase in temperature of the battery was small. In the battery of Comparative Example 2-1, a short-circuit current was decreased slowly, and heat generation was increased to substantially raise the battery temperature.

As described above, in the present embodiment, by optimizing the amount of water contained in the positive mixture, the total water amount in the battery system can be reduced, whereby an alkaline battery can be provided which has desirable load characteristics, has high safety at a time of occurrence of a short-circuit, and has desirable storage characteristics at high temperature.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An alkaline battery comprising a positive mixture molded in a ring shape comprising at least one selected from manganese dioxide and a nickel oxide as a positive active material and a negative mixture comprising a negative active material,
    wherein the positive mixture comprises an alkaline electrolytic solution comprising potassium hydroxide,
    an amount of water comprised in the positive mixture is 8.4 to 10 wt % with respect to a total weight of the positive mixture including the alkaline electrolytic solution, and
    the negative active material is zinc alloy powder, and a ratio of the zinc alloy powder that passes through a 200-mesh sieve is 4 to 40 wt % with respect to a total weight of the zinc alloy powder.

2. The alkaline battery according to claim 1, wherein the zinc alloy powder comprises at least one selected from indium, bismuth, and aluminum.

3. The alkaline battery according to claim 2, wherein contents of the at least one sciected from indium, bismuth, and aluminum comprised in the zinc alloy powder arc 0.03 to 0.07 wt %, 0.007 to 0.025 wt %, and 0.001 to 0.004 wt %, respectively.

* * * * *